(12) United States Patent
Hashimoto et al.

(10) Patent No.: US 8,029,129 B2
(45) Date of Patent: Oct. 4, 2011

(54) COVER SUPPORT MECHANISM AND IMAGE FORMING APPARATUS INCORPORATING THE SAME

(75) Inventors: Susumu Hashimoto, Katsuragi (JP); Jinichi Nagata, Osaka (JP); Hidetoshi Kaneko, Yamatokoriyama (JP); Yasunobu Ohkawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1008 days.

(21) Appl. No.: 11/717,695

(22) Filed: Mar. 14, 2007

(65) Prior Publication Data

US 2007/0215594 A1    Sep. 20, 2007

(30) Foreign Application Priority Data

Mar. 15, 2006  (JP) .................... 2006-071254

(51) Int. Cl.
*B41J 29/13* (2006.01)
*G03G 21/00* (2006.01)
(52) U.S. Cl. .................. 347/108; 399/124; 299/DIG. 15
(58) Field of Classification Search .................. 292/103, 292/129, 178, DIG. 15; 403/353; 347/108; 399/124
See application file for complete search history.

(56) References Cited

U.S. PATENT DOCUMENTS 3,495,587 A * 2/1970 Freedman ..................... 601/162
4,929,007 A * 5/1990 Bartczak et al. ........... 292/336.3

FOREIGN PATENT DOCUMENTS

| JP | 9-188034 A | 7/1997 |
| JP | 2005-91482 | 4/2005 |
| JP | 2005-141020 A | 6/2005 |

* cited by examiner

*Primary Examiner* — Mark Robinson
*Assistant Examiner* — Erin Chiem
(74) *Attorney, Agent, or Firm* — Birch, Stewart, Kolasch & Birch, LLP

(57) ABSTRACT

A cover support mechanism regulates an opening angle of an openable cover with respect to a chassis of an electronic device. The cover constitutes a portion of the chassis. The mechanism has a cord shaped or tape shaped stopper, and a support unit. The stopper has a first end portion and a second end portion, the first end portion being fixed to the cover. The support unit supports the second end portion of the stopper. The support unit is provided to the electronic device. The support unit has a receiving portion, a biasing member, and a braking unit. The receiving portion has a space for pulling in the second end portion of the stopper. The biasing member applies force to the stopper for pulling in the stopper into the receiving portion. The braking unit applies frictional force to the stopper when the cover is opened.

12 Claims, 6 Drawing Sheets

_COVER SUPPORT MECHANISM AND IMAGE FORMING APPARATUS INCORPORATING THE SAME_

CROSS REFERENCE

This Nonprovisional application claims priority under 35 U.S.C. §119(a) on Patent Application No. 2006-071254 filed in Japan on Mar. 15, 2006, the entire contents of which are hereby incorporated by reference.

BACKGROUND OF THE INVENTION

The present invention relates to a cover support mechanism which is provided to a portion of a chassis of an electronic device, and to an image forming apparatus which incorporates the cover support mechanism.

Almost every electronic device such as an image forming apparatus and the like has a chassis for covering its internal components. Since an openable cover is normally provided to such a chassis, it becomes possible to access the interior of the electronic device by opening the cover. Often such a cover is provided near a location where maintenance may be needed, or near a location where an operational irregularities may easily occur.

Among electronic devices which have covers of the type described above, there are some which are provided with mechanisms for regulating the opening angle of the cover, as described in Japanese Laid-Open Patent Publication Heisei 9-188034. In this Japanese Laid-Open Patent Publication Heisei 9-188034, there is disclosed an image forming apparatus which is made so that the opening angle of the cover is regulated by linking the image forming apparatus main body and the cover with a stopper shaped in the form of a tape.

However, with a structure in which the electronic device and the cover are linked together with a stopper in the form of a tape, there is a possibility that inconveniences of the following type may occur.

First, when the cover is closed, there is a possibility that the stopper may stick out from the chassis. The reason is that, if a stopper in the form of a cord or a tape is used, the stopper becomes slack when the cover is closed. The external appearance of the electronic devices suffers if the stopper sticks out from the chassis.

Next, when a stopper in the form of a cord or a tape is slack, there is a possibility that the point at which it is slack may become rolled upon on a rotating member internal to the electronic device, such as a gear or a roller or the like.

The inconveniences described above may occur particularly easily if the stopper becomes elongated due to repeated use. For this reason, it is necessary to eliminate the slack from the stopper in an adequate manner, in order to use such a stopper over the long term.

The object of the present invention is to provide a cover support mechanism which, with a simple structure, eliminates slack in a stopper which regulates an opening angle of an openable cover with respect to a chassis of an electronic device, the cover constituting a portion of the chassis.

SUMMARY OF THE INVENTION

The cover support mechanism according to the present invention regulates an opening angle of an openable cover with respect to a chassis of an electronic device. The cover constitutes a portion of the chassis. The mechanism has a cord shaped or tape shaped stopper, and a support unit.

The stopper has a first end portion and a second end portion, the first end portion being fixed to the cover. Examples of the stopper include wire, cord, tape, and chain.

The support unit supports the second end portion of the stopper. The support unit is provided to the electronic device. The support unit has a receiving portion, a biasing member, and a braking unit. The receiving portion has a space for pulling in the second end portion of the stopper. The biasing member applies force to the stopper for pulling in the stopper into the receiving portion. Examples of the biasing member include an elastic member such as a spring or rubber. Furthermore, if the stopper is wound up by a reel, a motor which applies force to the reel in the winding up direction may also correspond to this biasing member.

Even if the stopper becomes slack when the cover is closed, due to the action of the biasing member, this slack portion is received within the receiving portion. As a result, it becomes unlikely that obstacles to the operation of the electronic device arise due to the portion of the stopper which is slack sticking out from the chassis, or contacting components of the electronic device. Furthermore, even if the stopper has become elongated due to repeated opening and closing of the cover, the biasing member still retrieves this elongated portion within the receiving portion.

Furthermore, the support unit also has a braking unit which applies frictional force to the stopper when the cover is opened. When the braking unit applies frictional force to the stopper, it becomes easy to keep the wire stationary, and as a result it becomes easy for the cover to be kept stationary while it is open. Furthermore the biasing member can easily last over the long term, since the weight of the cover cannot easily be transmitted to the biasing member.

It should be understood that it is desirable for the receiving portion to be constituted as a long and narrow passage which slopes down towards the interior of the electronic device. The reason is that, in this case, the stopper which supports the opened cover is bent around the braking unit, so that the braking unit easily applies its frictional force to the stopper.

DETAILED DESCRIPTION OF THE INVENTION

Figure 1:
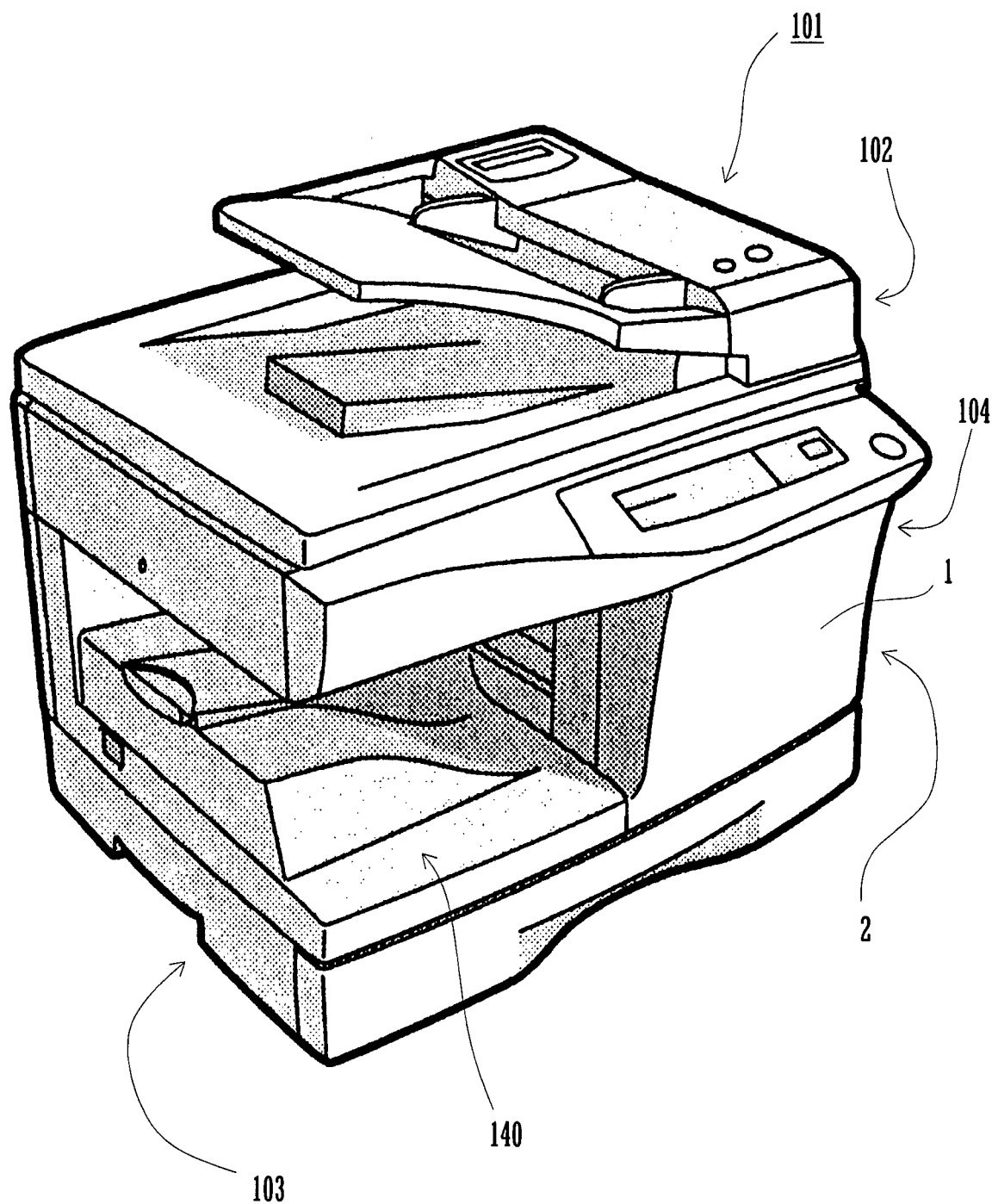
FIG. 1 is a perspective view showing the external appearance of an image forming apparatus.

As shown in FIG. 1, an image forming apparatus 101 comprises a document reading unit 102, a paper supply unit 103, an image forming unit 104, and a paper delivery unit 140. Furthermore, the image forming apparatus 101 comprises a chassis 2 which covers over the document reading unit 102, the paper supply unit 103, and the image forming unit 104. This chassis 2 comprises a front surface cover which opens and closes freely. The present invention relates to a cover support mechanism for supporting this front surface cover 1, and the details thereof will be described hereinafter.

The structure of this image forming apparatus 101 will now be explained in a simple manner using FIGS. 1 and 2. The document reading unit 102 is disposed at the upper portion of the image forming apparatus 101. On the other hand, the paper supply unit 103 is disposed at the bottom portion of the image forming apparatus 101. And the image forming unit 104 is disposed so as to be sandwiched between the document reading unit 102 and the paper supply unit 103. This image forming unit 104 has a horizontal cross section which is smaller than those of the document reading unit 102 and the paper supply unit 103. Due to this, a discharge space for discharging paper sheets from the image forming unit 104 is created, so as to be surrounded by the document reading unit 102, the paper supply unit 103, and the image forming unit 104. The paper delivery unit 140 is disposed in this discharge space.

An actuation unit and a start key are disposed upon the upper portion of the image forming apparatus 101. This actuation unit comprises a touch panel and displays the operational state of the image forming apparatus 101, and moreover receives input actuation from the user.

Figure 2:
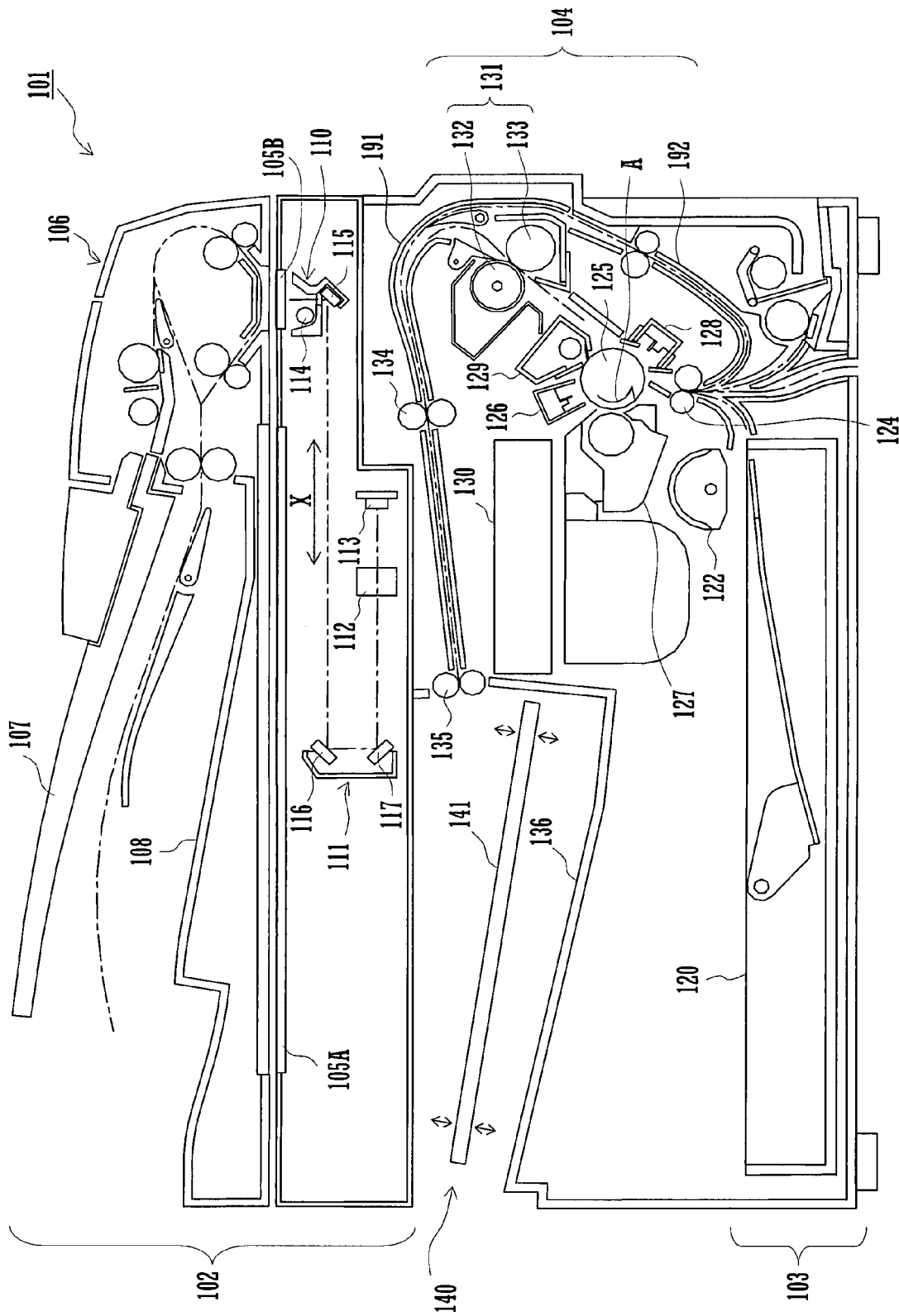
FIG. 2 is a figure showing the general internal structure of this image forming apparatus.

As shown in FIG. 2, the document reading unit 102 comprises document supports 105A, 105B which are made from transparent glass. An automatic document conveyance device 106 is disposed over these document supports 105A, 105B. This automatic document conveyance device 106 comprises a document tray 107, and a document which has been placed upon this document tray 107 is conveyed one sheet at a time past and over the document support 105B to a paper delivery tray 108.

Under the document supports 105A, 105B there are disposed a first scan unit 110, a second scan unit 111, an imaging lens 112, and a CCD sensor 113. The first scan unit 110 comprises an exposure lamp 114 and a first reflection mirror 115. The second scan unit 111 comprises a second reflection mirror 116 and a third reflection mirror 117. The exposure lamp 114 irradiates light upon a document upon the document support 105A or upon the document support 105B. The first reflection mirror 115, the second reflection mirror 116, and the third reflection mirror 117 conduct light reflected from the document to the CCD sensor 113. The imaging lens 112 images the reflected light from the document upon the CCD sensor 113. The CCD sensor 113 performs photoelectric conversion processing upon this imaged light and creates image data.

It should be understood that, when reading the document, the first scan unit 110 shifts at a speed V along a secondary scanning direction shown by the arrow sign X in FIG. 2, parallel to the document supports 105A, 105B. Furthermore, the second scan unit 111 operates together with the first scan unit 110 and shifts in the secondary scanning direction at the speed V/2.

The paper supply unit 103 comprises a paper supply cassette 120. This paper supply cassette 120 stores paper for image forming process. The paper supply cassette 120 is built so as to be capable of being pulled out from the front surface of the image forming apparatus 101.

The image forming unit 104 comprises a paper conveyance path 191, an inverted conveyance path 192, a photosensitive drum 125, an electrification unit 126, a laser scanning unit 130 (hereinafter simply termed a LSU), a development unit 127, a transcription unit 128, a cleaning unit 129, a resist roller 124, and a fixing device 131.

The paper conveyance path 191 is defined from the paper supply cassette 120 to a paper delivery roller 135. The inverted conveyance path 192 is connected to the paper conveyance path 191, and is used during double sided image forming. The photosensitive drum 125 is arranged so as to contact the paper conveyance path 191. This photosensitive drum 125 rotates in the anticlockwise direction, as shown by the arrow sign A. The electrification unit 126 electrifies the outer circumferential surface of the photosensitive drum 125 to a predetermined electrical potential. The LSU 130 creates a latent electrostatic image based upon image data, by irradiating laser light upon the outer circumferential surface of the photosensitive drum 125 which has been electrified to that predetermined electrical potential. The development unit 127 makes visible the latent electrostatic image which has thus been formed upon the outer circumferential surface of the photosensitive drum 125, and creates a toner image. The transcription unit 128 transcribes this toner image which has been created upon the outer circumferential surface of the photosensitive drum 125 to paper. The cleaning unit 129 retrieves toner which has been left over upon the outer circumferential surface of the photosensitive drum 125. The resist roller 124 is disposed upstream of the photosensitive drum 125 in the paper conveyance path, and feeds paper between the photosensitive drum 125 and the transcription unit 128 at a predetermined timing. The fixing device 131 is disposed downstream of the photosensitive drum 125 in the paper conveyance path, and comprises a heat application roller 132 and a pressurization roller 133. This fixing device 131 fixes a toner image which is adhering to a sheet of paper to that paper with this heat application roller 132 and pressurization roller 133.

Downstream of the fixing device 131 in the paper conveyance path 191, there are disposed conveyance rollers 134 and paper delivery rollers 135. And a paper delivery unit 140 is disposed at a position to receive paper which is discharged to the exterior by the paper delivery rollers 135.

The paper delivery unit 140 comprises a fixed paper delivery tray 136 and a movable paper delivery tray 141. The movable paper delivery tray 141 is movable between an upper position and a lower position. When the movable paper delivery tray is positioned in its upper position, then paper is discharged upon the fixed paper delivery tray 136. On the other hand, when the movable paper delivery tray 141 is positioned in its lower position, then paper is discharged upon the movable paper delivery tray 141.

Figure 3:
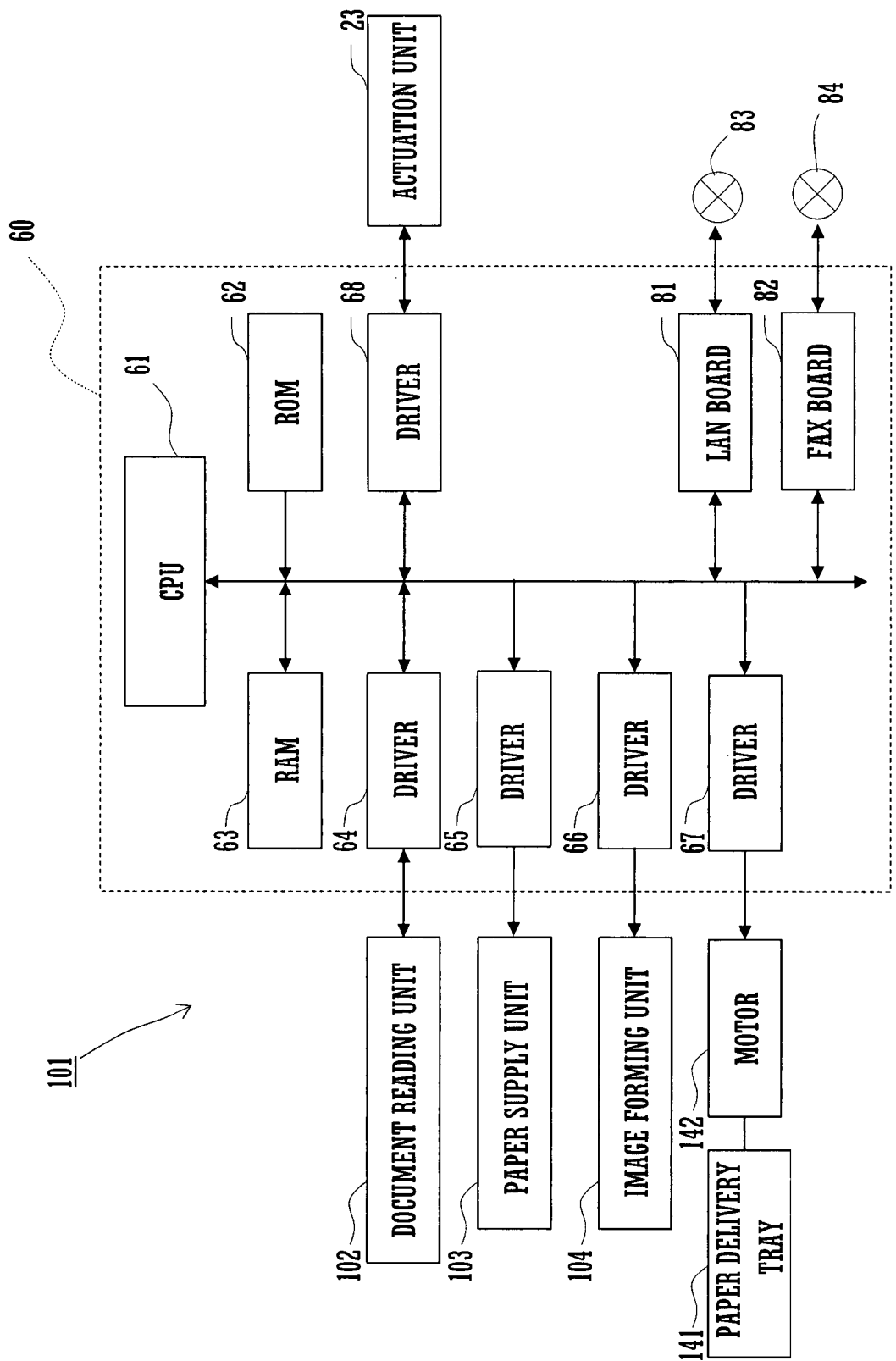
FIG. 3 is a block diagram showing the general internal structure of this image forming apparatus.

As shown in FIG. 3, the image forming apparatus 101 comprises a control unit 60. This control unit 60 comprises a ROM 62, a RAM 63, a CPU 61, a LAN board 81, a FAX board 82, and drivers 64 through 68. The ROM 62 stores a program which is necessary for the operation of the image forming apparatus 101. The RAM 63 is a volatile memory which primarily stores image data for a document which has been read in. The CPU 61 controls the operation of the image forming apparatus 101 in an integrated manner based upon the program stored in the ROM 62. The LAN board 81 is endowed with a function of communicating with an external device such as a personal computer or the like which is connected via a network 83. And the FAX board 82 is endowed with a function for communicating with an external device such as a facsimile or the like which is connected via a public circuit 84.

The driver 64 drives the document reading unit 102 based upon signals from the CPU 61. The driver 65 drives the paper supply unit 103 based upon signals from the CPU 61. The driver 66 drives the image forming unit 104 based upon signals from the CPU 61. The driver 67 elevates or lowers the movable paper delivery tray 141 according to the operation of a motor 142, based upon signals from the CPU 61. And the driver 68 transfers the contents of input actuation upon the actuation unit 23 to the CPU 61. Moreover, the driver 68 controls the display operation of the actuation unit 23, based upon signals from the CPU 61.

The image forming apparatus 101 operates in any one of the following operation modes: a copier mode, a printer mode, and a FAX mode. In the copier mode, the image forming unit 104 performs image forming process based upon image data created by the document reading unit 102. It should be understood that the image data which has been created by the document reading unit 102 is stored in the RAM 63 after having been subjected to image processing by the control unit 60 in a predetermined sequence. In the printer mode, the image forming unit 104 performs image forming process based upon image data inputted via the LAN board 81. And, in the FAX mode, the image forming unit 104 performs image forming process based upon image data inputted via the FAX board 82.

Figure 4A:
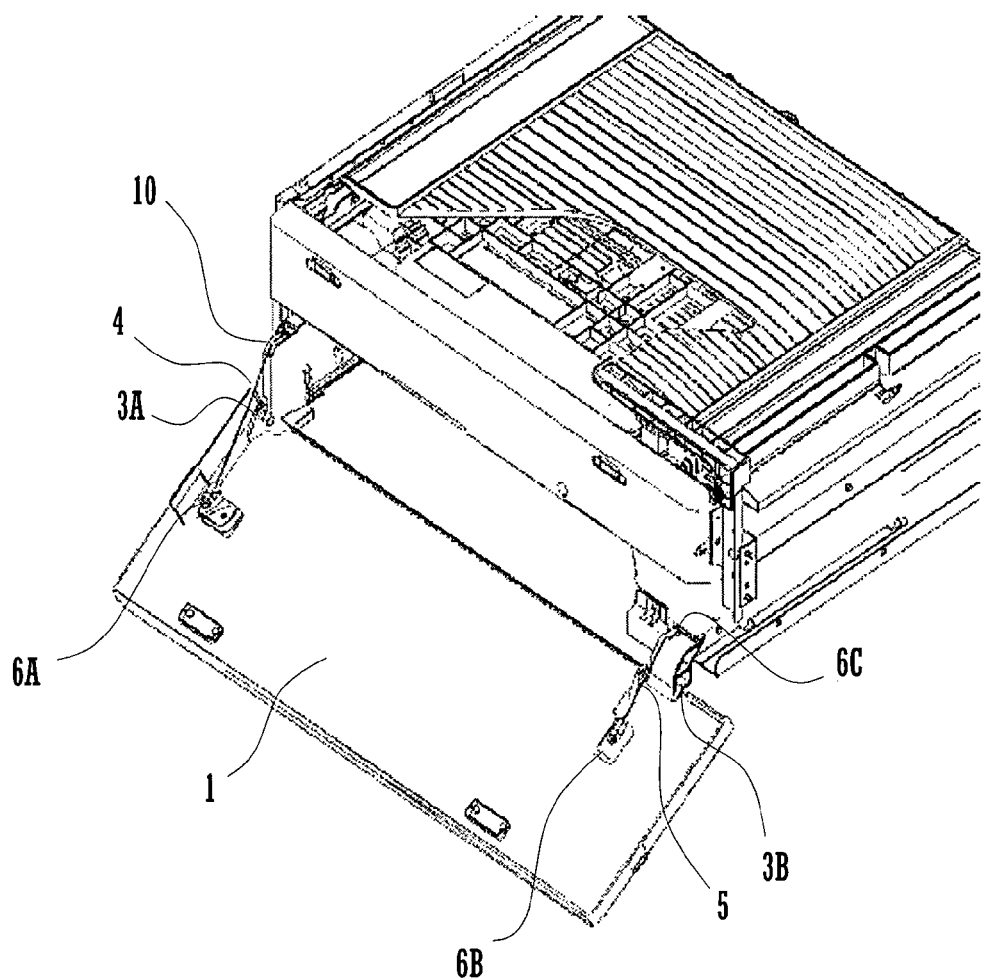
FIG. 4 is a figure showing a state with a front cover opened.
Figure 4B:
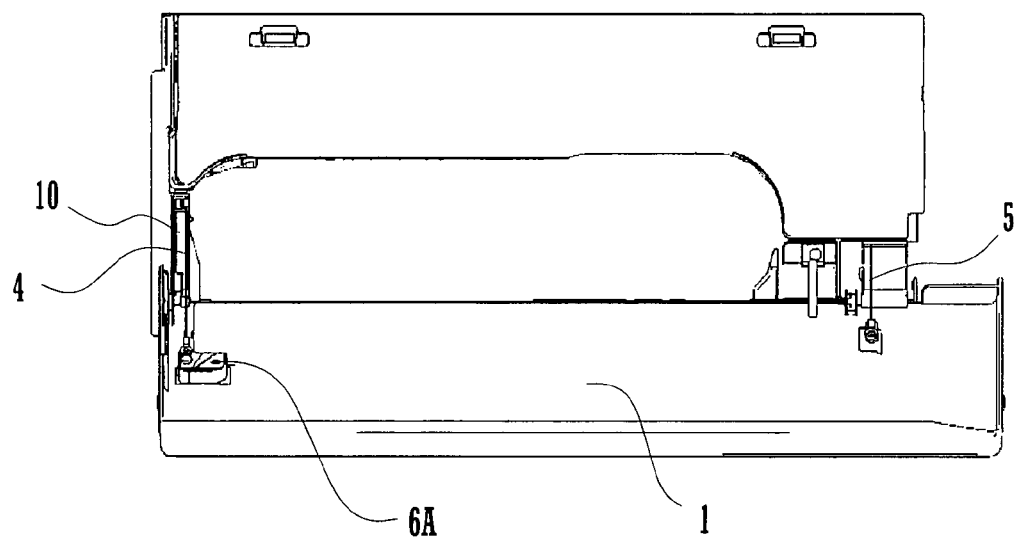

Next the construction and the operation of the front cover 1 will be explained using FIGS. 4A and 4B. This front surface cover 1 is rotatably supported upon supports units 3A, 3B which are provided to the chassis 2.

The front surface cover 1 comprises fixing lugs 6A, 6B for attaching respective wires 4, 5 which regulate the angle to which the front surface cover 1 opens. A first end portion of the wire 4 is fixed to the fixing lug 6A. The second end portion of this wire 4 is supported on a support unit 10 which is provided to the image forming apparatus 101. And a first end portion of the wire 5 is fixed to the fixing lug 6B. The second end portion of this wire 5 is fixed to a fixing lug 6C which is provided to the image forming apparatus 101.

The fixing lug 6B is arranged at a position which is somewhat inwards from the side end portion of the front surface cover 1. Due to this, it is unlikely for the wire 5 to stick out to the exterior of the front surface cover 1, even if the wire 5 is slack. Furthermore, in this embodiment, the fixing lug 6C is arranged so that a certain distance is provided from rotating members such as the gears and rollers of the image forming apparatus 101. Due to this, even if the wire 5 is slack, it is unlikely for the point at which the wire 5 is slack to get wound up around some rotating member of the image forming apparatus 101, which would constitute an inconvenience.

On the other hand, the fixing lug 6A is disposed in the neighborhood of the side end portion of the front surface cover 1. Due to this, when the wire 4 is loose, the possibility that it should stick out to the exterior from the front surface cover is high. Furthermore, in this embodiment, the wire 4 is disposed in the neighborhood of certain rotating members of the image forming apparatus 101. Because of this, it is necessary to prevent the wire 4, if it should become slack, from becoming wound up around any rotating member of the image forming apparatus 101.

Thus, in this image forming apparatus 101, slackening of the wire 4 is prevented by the support unit 10. It should be understood that although, in this embodiment, no support unit 10 is used for supporting the second end portion of the wire 5, it would also be possible to provide a separate support unit 10 for supporting the wire 5.

Figure 5A:
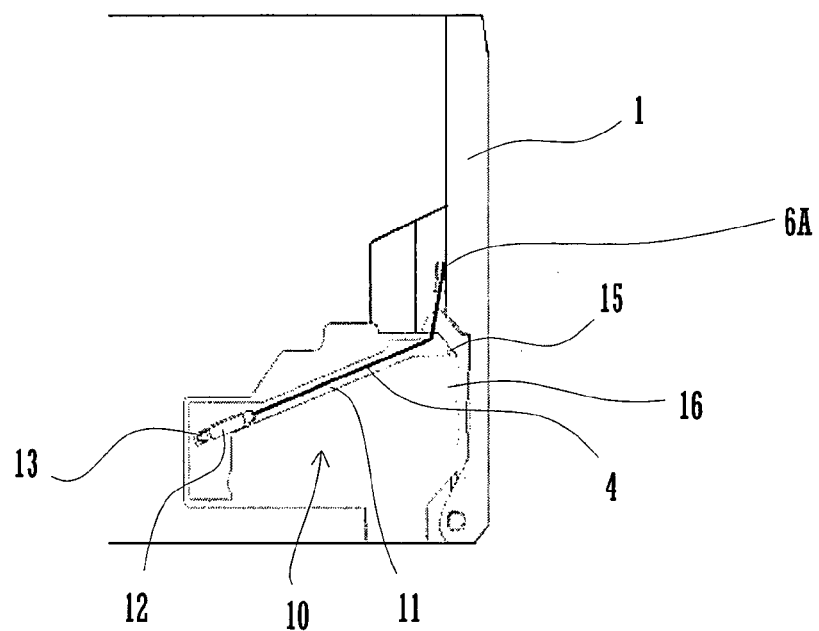
FIG. 5 is an explanatory figure showing a support unit which supports a wire.
Figure 5B:
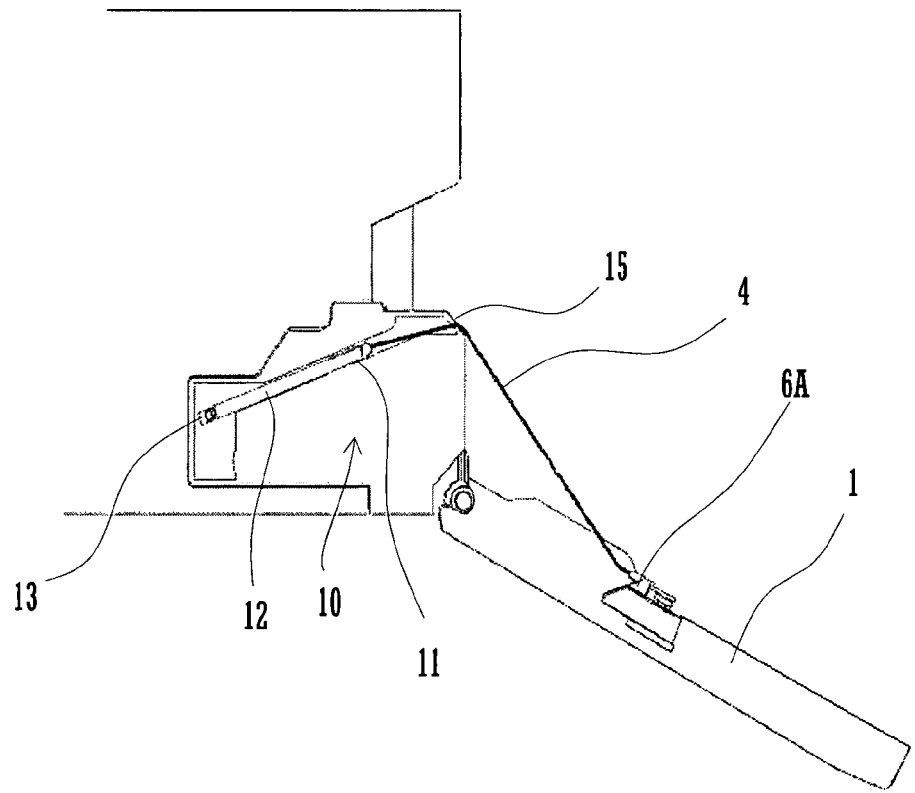

Now the structure of the support unit 10 will be explained using FIGS. 5A and 5B. This support unit 10 supports the second end portion of the wire 4. The support unit comprises a frame 16. The frame 16 is fixed in a predetermined position near to the front end portion of the image forming apparatus 101. A receiving portion 11 is provided on the inside of the frame 16, and has a space for pulling in the second end portion of the wire 4. In this embodiment, this receiving portion 11 is constituted by a long and narrow passage which slopes towards the interior of the image forming apparatus 101. The reason that the receiving portion 11 is made in this manner, is in order for the wire 4, which is suspending the opened front surface cover 1, to be able to bend around at its intermediate portion. However, although this structure is desirable from the point of view that the bending round of the wire 4 at its intermediate portion applies friction to the wire 4, this is not structurally essential for the present invention.

Furthermore, the support unit 10 comprises a spring 12 which is connected to the wire 4, in order to pull the wire 4 into the receiving portion 11. A first end portion of this spring 12 is connected to the wire 4. On the other hand, a second end portion of the spring 12 is fitted to a fixing lug 13 which is formed at the bottom of the receiving portion 11. In this embodiment, the spring 12 corresponds to the biasing member of the Claims.

Moreover, a slot 15 is formed upon the frame 16 of the support unit 10, and is made so as to apply a frictional force to the wire 4, when the front surface cover 1 is opened. In this embodiment, the spot at which the slot 15 is formed in the frame 16 corresponds to the braking unit of the Claims.

Figure 6A:
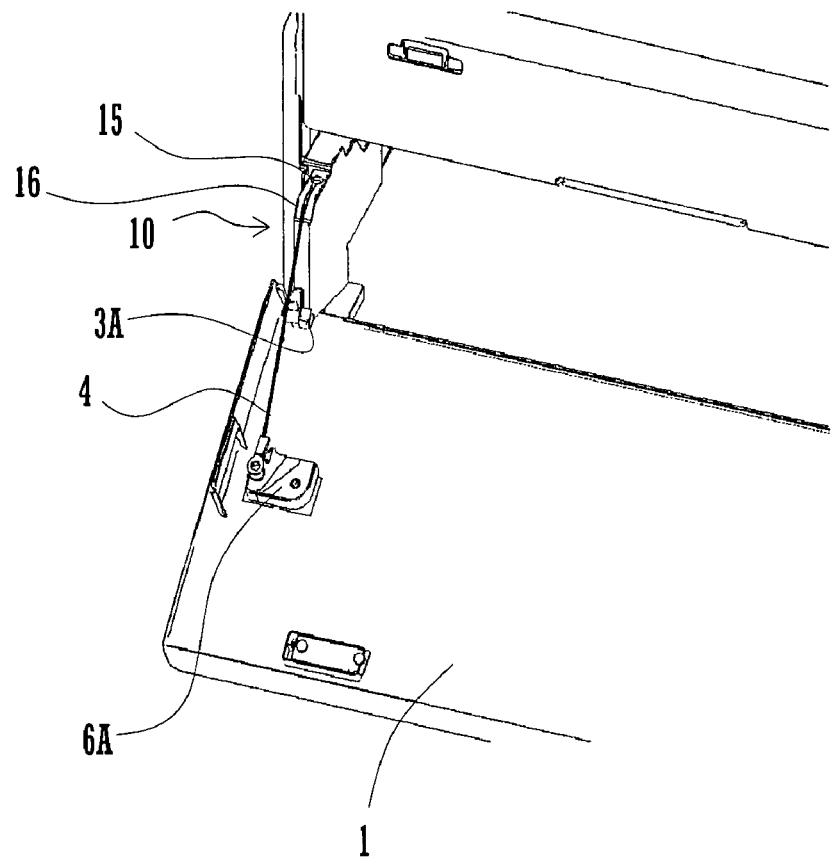
FIG. 6 is an explanatory figure showing a braking unit provided to a support unit.
Figure 6B:
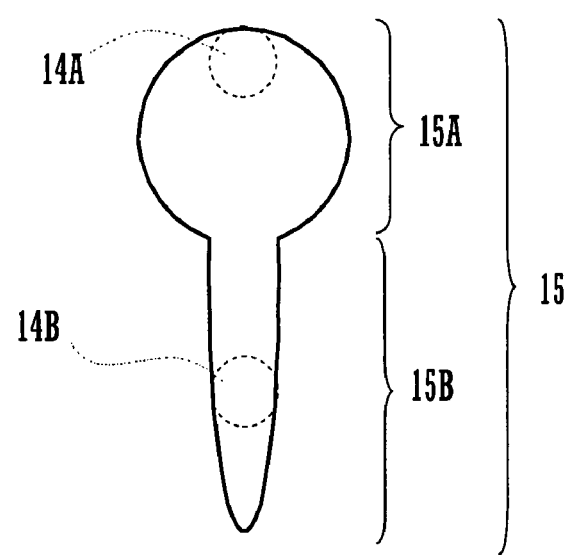

This slot 15 will now be explained using FIGS. 6A and 6B. As shown in FIG. 6B, this slot 15 comprises a round hole portion 15A and a notch portion 15B. It should be understood that, in this figure, the reference symbol 14A denotes the position of the wire 4 when the front surface cover 1 is closed, while the reference symbol 14B denotes the position of the wire 4 when the front surface cover 1 is opened.

The round hole portion 15A contacts the wire 4 when the front surface cover 1 is closed. This round hole portion 15A is designed with the intention of alleviating the friction between the wire 4 and the frame 16 when the front surface cover 1 is closed. When the front surface cover is closed, the friction between the wire 4 and the frame 16 becomes smaller, and it becomes easy for the wire 4 to be pulled into the frame 16 by the spring 12.

The notch portion 15B contacts the wire 4 when the front surface cover 1 is opened. This notch portion 15B is made so that its width becomes narrower in the downward direction. And the notch portion 15B is designed with the intention that, when the front surface cover 1 is opened, the friction between the wire 4 and the frame 16 is increased. When the front surface cover 1 is opened, the friction between the wire 4 and the frame 16 becomes great, and braking is applied to the wire 4. In other words, it becomes possible to keep the wire 4 stationary, even when the elastic force of the spring 12 and the weight of the front surface cover 1 both act upon the wire 4. Furthermore, by keeping the wire 4 stationary, the merit is also obtained that it becomes easy to keep the front cover 1 stationary in the opened state. Moreover, by applying braking to the wire 4, it becomes easy for the durability of the spring 12 to be maintained, since the weight of the front surface cover 1 cannot easily be exerted upon the spring 12.

It should be understood that, if consideration is given to convenience when closing the front surface cover 1, it is not desirable to make the tip end portion of the notch portion 15B in an extremely sharp letter "V" shape. The reason why is that it becomes difficult to close the front surface cover 1, if the wire 4 becomes caught in the tip end portion of the notch portion 15B.

Although, in the embodiment described above, the wire 4 has been explained as being a stopper, the stopper of the present invention is not limited to being a wire 4. Instead of the wire 4, it would also be possible to employ a chain or a cord shaped or tape shaped member such as resin tape or the like as the stopper. In other words, it would be possible to apply the present invention in any appropriate manner, provided that a stopper is used which supports the front surface cover 1 by suspending the front surface cover 1, and moreover in which slack can easily build up when the front surface cover 1 is closed.

Moreover, the braking unit explained herein is not limited to the frame 16 which has the slot 14. For example, it would also be acceptable to constitute the braking unit of the present unit by a mechanism such as one in which, as the wire 4 is pulled out from the support unit 10, the wire 4 is strongly pinched by a cam Furthermore although, in the embodiment described above the cover support mechanism was applied to the front surface cover 1, it could also be applied to a cover support mechanism provided to a cover upon some other surface other than the front surface of the image forming apparatus 101.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. A cover support mechanism which regulates an opening angle of an openable cover with respect to a chassis of an electronic device, the cover constituting a portion of the chassis, the mechanism comprising:
    a cord shaped or tape shaped stopper having a first end portion and a second end portion, the first end portion being fixed to the cover; and
    a support unit for supporting the second end portion of the stopper, the support unit being provided to the electronic device,
    wherein the support unit comprises:
        a receiving portion which has a space for pulling in the second end portion of the stopper;
        a biasing member adapted to apply force to the stopper for pulling in the stopper into the receiving portion; and
        a braking unit adapted to apply frictional force to the stopper, the braking unit having a frame defining a hole portion and a notch portion extending from the hole portion, the notch portion having a length longer than a diameter of the stopper, and a width of the notch portion gradually reduces as the notch portion extends away from the hole portion,
    wherein the stopper extends through the hole portion when the cover is in a closed position, and moves through the notch portion in the direction away from the hole portion as the cover is moved in an open direction, such that the frictional force applied to the stopper gradually increases as the cover is moved in the open direction.

2. The cover support mechanism according to claim 1, wherein the biasing member is a spring connected to the second end portion of the stopper, the biasing member being fixed to the inside of the receiving portion.

3. The cover support mechanism according to claim 2, wherein the stopper is a wire.

4. The cover support mechanism according to claim 3, wherein the receiving portion comprises a long and narrow passage which slopes down towards the interior of the electronic device, and
wherein the width of the notch portion becomes narrower as the notch portion extends becoming narrower downwards such that a wider portion in an upper portion of the notch alleviates the frictional force applied to the stopper when the cover is closed and such that a narrower portion in a lower portion of the notch increases the frictional force applied to the stopper when the cover is open.

5. An image forming apparatus, comprising:
a chassis comprising an openable cover, and
the cover support mechanism according to claim 1.

6. The image forming apparatus according to claim 5, wherein the biasing member is a spring connected to the second end portion of the stopper, the biasing member being fixed to the inside of the receiving portion.

7. The image forming apparatus according to claim 6, wherein the stopper is a wire.

8. The image forming apparatus according to claim 7, wherein the receiving portion comprises a long and narrow passage which slopes down towards the interior of the electronic device, and
wherein the width of the notch portion becomes narrower as the notch portion extends downward.

9. The cover support mechanism according to claim 1, wherein the braking unit is further adapted to apply frictional force to the stopper when the cover is opened that is of sufficient magnitude to overcome the force applied to the stopper and the weight of the cover so as to keep the stopper stationary.

10. The cover support mechanism according to claim 3, wherein the braking unit comprises a frame having a round hole portion in an upper part of the frame and a notch portion in a lower part of the frame such that the round portion alleviates the frictional force applied to the stopper when the cover is closed and such that the notched portion increases the frictional force applied to the stopper when the cover is open.

11. The cover support mechanism according to claim 10, wherein the braking unit is further adapted to apply frictional force to the stopper when the cover is opened that is of sufficient magnitude to overcome the force applied to the stopper and the weight of the cover so as to keep the stopper stationary.

12. The cover support mechanism according to claim 4, wherein the braking unit is further adapted to apply frictional force to the stopper when the cover is opened that is of sufficient magnitude to overcome the force applied to the stopper and the weight of the cover so as to keep the stopper stationary.

* * * * *